(12) United States Patent
Lee et al.

(10) Patent No.: US 11,600,170 B2
(45) Date of Patent: Mar. 7, 2023

(54) FAN SYSTEM AND FAN DRIVING METHOD

(71) Applicant: Sentelic Corporation, Taipei (TW)

(72) Inventors: Wen-Ting Lee, Taipei (TW);
Yu-Chung Tsao, Taipei (TW)

(73) Assignee: Sentelic Corporation, Taipei (TW)

( * ) Notice: Subject to any disclaimer, the term of this patent is extended or adjusted under 35 U.S.C. 154(b) by 0 days.

(21) Appl. No.: 17/316,738

(22) Filed: May 11, 2021

(65) Prior Publication Data

US 2022/0246027 A1 Aug. 4, 2022

(30) Foreign Application Priority Data

Feb. 3, 2021 (TW) ................................ 110104074

(51) Int. Cl.
*G08C 19/12* (2006.01)
(52) U.S. Cl.
CPC ..................................... *G08C 19/12* (2013.01)
(58) Field of Classification Search
CPC ........... G08C 19/12; H02P 6/04; G05B 15/02; G05B 2219/2614
See application file for complete search history.

(56) References Cited

U.S. PATENT DOCUMENTS

| | | | |
|---|---|---|---|
| 3,821,604 A | 6/1974 | Walraven | |
| 10,018,202 B1* | 7/2018 | Lai | ............................. H02P 5/46 |
| 2002/0060544 A1* | 5/2002 | Teutsch | ................... H02P 6/085 |
| | | | 318/599 |
| 2003/0094913 A1* | 5/2003 | Makaran | .................... H02P 6/04 |
| | | | 318/78 |
| 2010/0207743 A1* | 8/2010 | Jackson | .................. G05B 15/02 |
| | | | 340/12.32 |
| 2011/0051357 A1* | 3/2011 | Orr | ........................... G06F 1/20 |
| | | | 361/679.48 |
| 2014/0028292 A1 | 1/2014 | Huang et al. | |
| 2015/0108934 A1* | 4/2015 | Wong | .................. F04D 25/0613 |
| | | | 318/472 |
| 2017/0198706 A1* | 7/2017 | Wang | ...................... F04D 25/08 |
| 2018/0195515 A1* | 7/2018 | Chen | ......................... H02P 6/04 |

FOREIGN PATENT DOCUMENTS

| | | |
|---|---|---|
| CN | 105224047 A | 1/2016 |
| CN | 108809163 A | 11/2018 |
| CN | 109026809 A | 12/2018 |
| CN | 111911440 A | 11/2020 |
| TW | I355137 B | 12/2011 |
| WO | 2020/236162 A1 | 11/2020 |

* cited by examiner

*Primary Examiner* — Andrew W Bee
(74) *Attorney, Agent, or Firm* — CKC & Partners Co., LLC

(57) ABSTRACT

The present disclosure relates to a fan system and a fan driving method. The fan driving method includes the following steps: transmitting a first control signal to a first fan and a second fan by a processor; determining whether a first control frequency of the first control signal is within a first frequency band and a second frequency band, wherein the first frequency band and the second frequency band are different; when the first control frequency is within the first frequency band, adjusting a first rotation speed of the first fan according to the first control signal; and when the first control frequency is within the second frequency band, adjusting a second rotation speed of the second fan according to the first control signal.

14 Claims, 6 Drawing Sheets

FAN SYSTEM AND FAN DRIVING METHOD

CROSS-REFERENCE TO RELATED APPLICATION

This application claims priority to Taiwan Application Serial Number 110104074, filed Feb. 3, 2021, which is herein incorporated by reference in its entirety.

BACKGROUND

Technical Field

The present disclosure relates to a fan system and a fan driving method, which is particularly used to control the rotating speed of multiple fans.

Description of Related Art

With the development of technology, the operating frequency of various electronic devices has increased, but the increase in operating frequency increases the internal temperature of the electronic device during operation. In order to prevent high temperature from affecting the operation of electronic devices and even damage to electronic devices, "fans" have become an indispensable accessory for electronic devices to maintain operation.

Generally speaking, the fan system includes multiple fans, and the fans are controlled at the same rotating speed. However, during actual operation of the fans, rotating speed often fluctuates due to various variables or different operating requirements, and the rotating speed may also be adjusted according to power supply requirements.

SUMMARY

One aspect of the present disclosure is a fan driving method, comprising the following steps: transmitting, by a processor, a first control signal to a first fan and a second fan, wherein the first control signal has a first frequency; determining whether the first frequency is within a first frequency band or a second frequency band, wherein the first frequency band is different from the second frequency band; when the first frequency is within the first frequency band, adjusting a first rotating speed of the first fan according to the first control signal; and when the first frequency is within the second frequency band, adjusting a second rotating speed of the second fan according to the first control signal.

Another aspect of the present disclosure is a fan system, comprising a first fan, a second fan and a processor. The first fan is electrically coupled to a driving power, and driven by the driving power. The second fan is electrically coupled to the driving power, and driven by the driving power. The processor is electrically coupled to the first fan and the second fan, and configured to transmit a first control signal to the first fan and the second fan. The first fan and the second fan are configured to determine a first frequency of the first control signal is within a first frequency band. When the first frequency is within the first frequency band, the first fan adjusts a first rotating speed of the first fan according to the first control signal. When the first frequency is within the second frequency band, the second fan adjusts a second rotating speed of the second fan according to the first control signal.

Another aspect of the present disclosure is a fan driving method, comprising the following steps: transmitting, by a processor, a start control signal to a plurality of fans, wherein the plurality of fans operates according to the start control signal, the start control signal has a start control frequency, the plurality of fans store a plurality of frequency bands, and the frequency bands are different from each other; transmitting a first control signal to the plurality of fans, wherein the first control signal has a first frequency different from the start control frequency; when the first frequency is within one of the plurality of frequency bands, adjusting a rotating speed of one of the plurality of fans according to the first control signal; and maintaining rotating speeds of other of the plurality of fans according to the start control signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
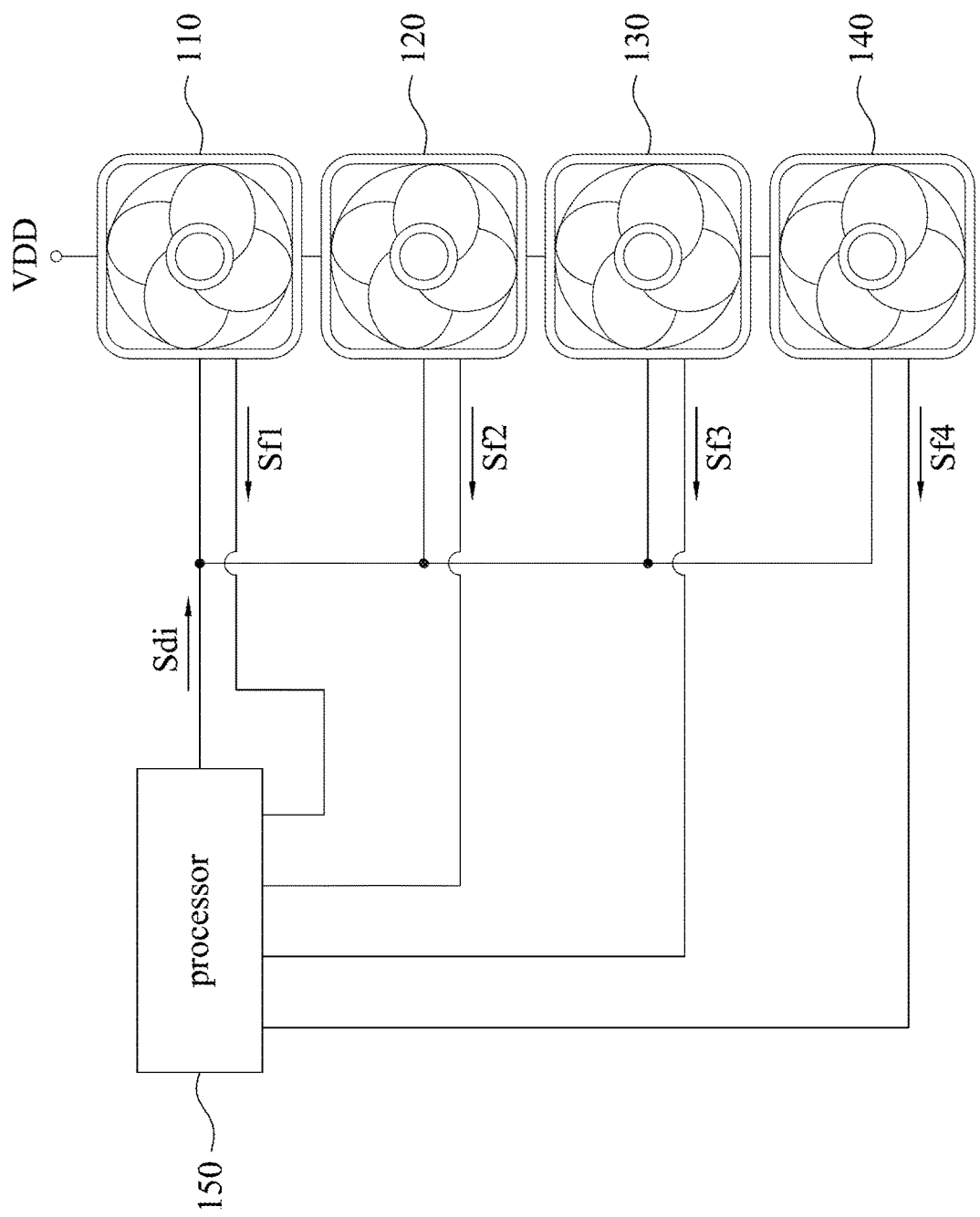
FIG. 1 is a schematic diagram of a fan system in some embodiments of the present disclosure.

FIG. 1 is a schematic diagram of a fan system 100 in some embodiments of the present disclosure. The fan system 100 includes a processor 150 and multiple fans 110-140. The fan 110-140 is electrically coupled to a power supply VDD, so as to receive a driving power, and operates according to a control signal Sdi transmitted by the processor 150.

During operating, the first fan 110 may detect the current rotating speed to generate a first fan rotating speed signal Sf1. Similarly, the fans 120/130/140 may detect the current rotating speed to generate the corresponding fan rotating speed signals Sf1-Sf4. The fan rotating speed signals will be transmitted back to the processor 150, so that the processor 150 may accordingly obtain the operation state of the fans 110-140.

Figure 2:
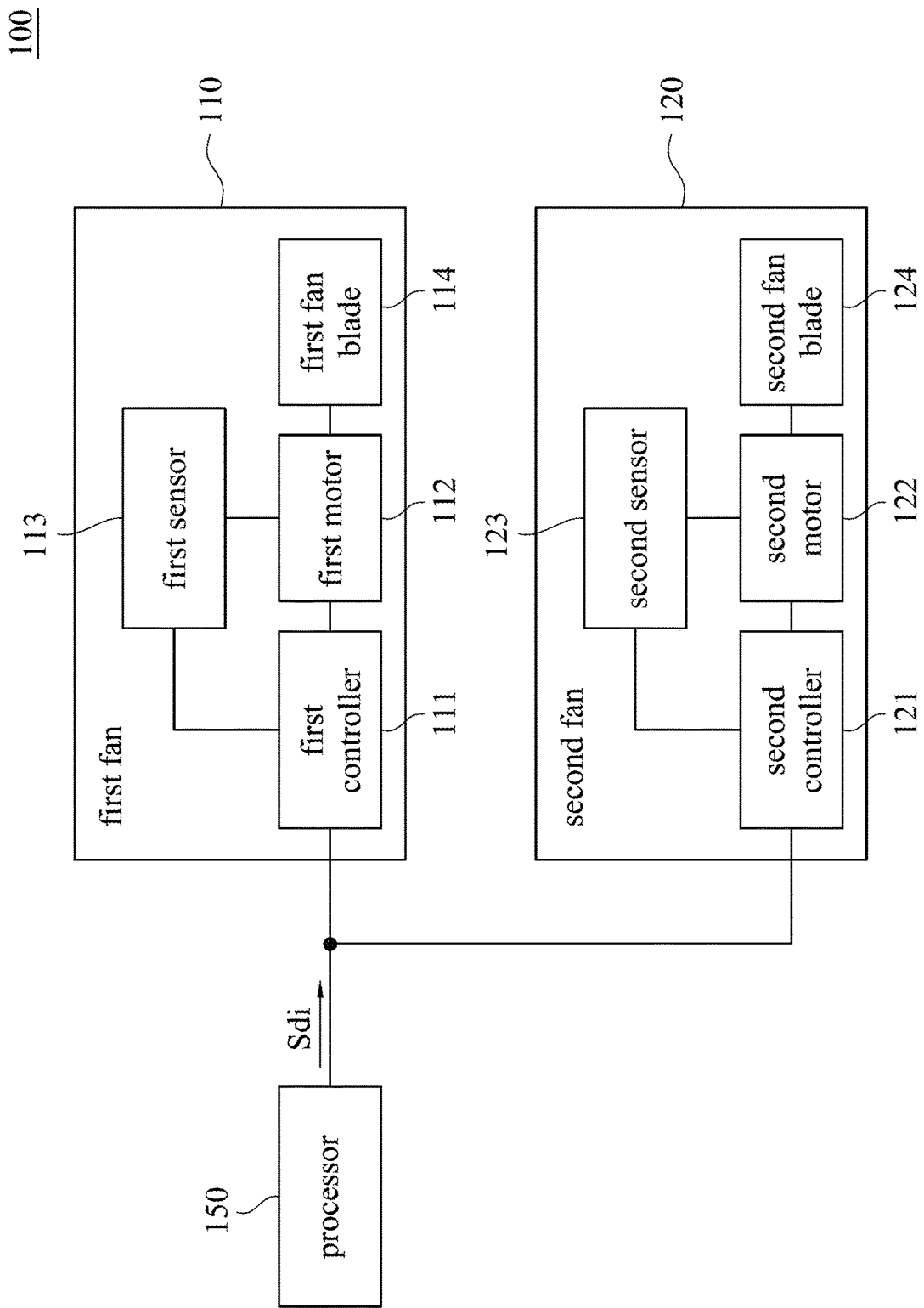
FIG. 2 is a schematic diagram of a fan system in some embodiments of the present disclosure.

FIG. 2 is a schematic diagram of the fan system 100 and the internal structure of the fan in some embodiments of the present disclosure. In order to make the diagram easy to understand, FIG. 2 only shows the fans 110 and 120. As shown in figure, the first fan 110 includes a first controller 111, a first motor 112, a first sensor 113 and a first fan blade 114. The second fan 120 includes a second controller 121, a second motor 122, a second sensor 123 and a second fan blade 124. The controller 111/121 respectively generate the corresponding driving signal according to the control signal Sdi provided by the processor 150 and the driving power provided by the power supply VDD, so as to adjust the power supplied to the motors 112/122, and to drive the fan blades 114/124 to rotate.

In some embodiments, the control signal Sdi is a form of Pulse Width Modulation (PWM). The duty cycle of the control signal Sdi is configured to indicate an expected rotating speed of the fan. For example, when the duty cycle of the control signal is 60%, it means that the current rotating speed of the fan is 60% of the maximum rotating speed.

The fan rotating speed signals Sf1-Sf4 are configured to represent the current rotating speed of the fans 110-140. In one embodiment, sensors 113/123 of in the first fan 110 and the second fan 120 are configured to detect the positions of the fan blades 114/124 or the rotor positions in the motors 112/122, so as to generate the fan rotating speed signals. The fan rotating speed signals may be a form of Pulse Width Modulation. The sensor 113/123 may be a position sensor, but it is not limited to this. In other embodiments, the sensor in the fan can receive a feedback current of the motor 112/122 to calculate a current position of the fan blade or the motor rotor. Since those in the art can understand the method the fan rotating speed signal is generated, it will not be repeated here.

In one embodiment, the fans 110-140 are electrically coupled to the same terminal of the processor 150, so as to receive the control signal Sdi. In other words, the processor 150 transmits the same control signal Sdi to all the fans 110-140 through the same transmission path. In some embodiments, the fan system 100 can be applied to a server or computer system. The rotating speed of fans 110-140 is controlled by the same processor 150.

In one of operation, the fan adjusts the rotating speed according to the duty cycle of the control signal. Therefore, if different fans operate at different the rotating speeds, the processor must transmit different control signals to each the fan through different transmission paths. However, this method is equivalent to the processor independently controlling each the fan, so it cannot save the number of terminals (pins) on the processor. The present disclosure uses the "frequency" of the control signal Sdi as the judgment parameter, so it can achieve different rotating speed control methods without changing the number and configuration of terminals of the processor 150.

In one embodiment, the first fan 110 stores a first frequency band, and the second fan stores a second frequency band (e.g., stored in the memory of the fan). The first frequency band and the second frequency band are different from each other. For example, the first frequency band is 27 KHz±500 Hz, and the second frequency band is 28 KHz±500 Hz. When the fan 110/120 receives the control signal Sdi, the fan 110/120 will first determine whether the control frequency of the control signal is within the frequency band stored internally. If the control frequency is within the frequency band stored internally, the fan 110/120 adjust the rotating speed according to the received the control signal. If the control frequency is not within the frequency band stored internally, the fan 110/120 ignores the current control signal, and continues to maintain the same rotating speed according to the previous control signal (e.g., the frequency corresponds to the frequency band stored in the fan).

For example, if the first frequency of the first control signal is 57.2 KHz and corresponds to the first frequency band, the first fan 110 adjusts the rotating speed according to the first control signal, but the second fan 120 does not adjust the rotating speed according to the first control signal speed. Similarly, if the first frequency of the first control signal is 58.2 KHz and corresponds to the second frequency band, then the first fan 110 does not adjust the rotating speed according to the first control signal, but the second fan 120 adjusts the rotating speed according to the first control signal.

As mentioned above, when the processor 150 transmits the first control signal to the fan 110/120, the first fan 110 may adjust the rotating speed according to the first control signal, but the second fan 120 does not adjust the rotating speed according to the first control signal. Then, the processor 150 transmits the second control signal to the fan 110/120. At this time, if the second frequency of the second control signal is not with the first frequency band, but is with the second frequency band, the first fan 110 will still maintain the rotating speed according to the first control signal, but the second fan 120 changes to adjust the rotating speed according to the second control signal.

In some embodiments, All of fans 110, 120 also store the same common frequency band (e.g., 25 KHz±500 Hz). Therefore, when the control signal Sdi transmitted by the processor 150 is in the common frequency band, all the fans 110/120 will adjust the rotating speed according to the control signal Sdi.

The fan 110/120 and the frequency band data stored in it can be shown in the table below:

| | |
|---|---|
| first frequency band | 27 KHz ± 500 Hz |
| second frequency band | 28 KHz ± 500 Hz |
| third frequency band | 29 KHz ± 500 Hz |
| fourth frequency band | 30 KHz ± 500 Hz |
| common frequency band | 25 KHz ± 500 Hz |

As shown in FIG. 2, in one embodiment, when the fan 110/120 determines that the received control frequency of the control signal Sdi corresponds to the stored frequency band, the fan 110/120 obtains the duty cycle of the control signal Sdi, and generates or adjust a driving signal according to the duty cycle. The driving signal is configured to drive the motor 112/122 to change the rotating speed of the fan blade 114/124.

Then, the sensor 113/123 detects the rotor position of at least one rotor of the motor 112/122, or detects at least one fan blade position of the fan blade 114/124, or respectively calculates the fan blade position to generate the fan rotating speed signals Sf1-Sf2 according to the feedback current of the motor.

Figure 3:
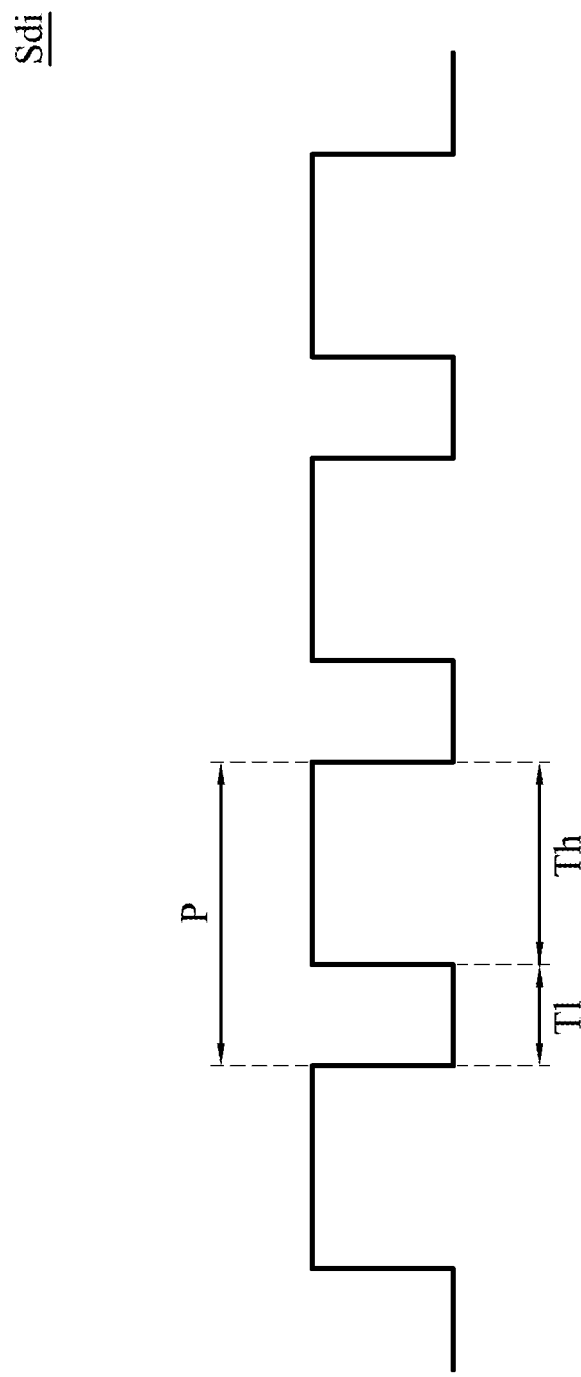
FIG. 3 is a waveform of the control signal in some embodiments of the present disclosure.

FIG. 3 is a waveform of the control signal Sdi in some embodiments of the present disclosure. As shown in figure, in each period P, the ratio of the high level time Th and the low level time Tl of the control signal Sdi is the duty cycle. For example, 70% of the period P is the high level time Th, so the duty cycle is 70%. The processor 150 can adjust the length of the period P of the control signal Sdi to change the frequency.

Figure 4:
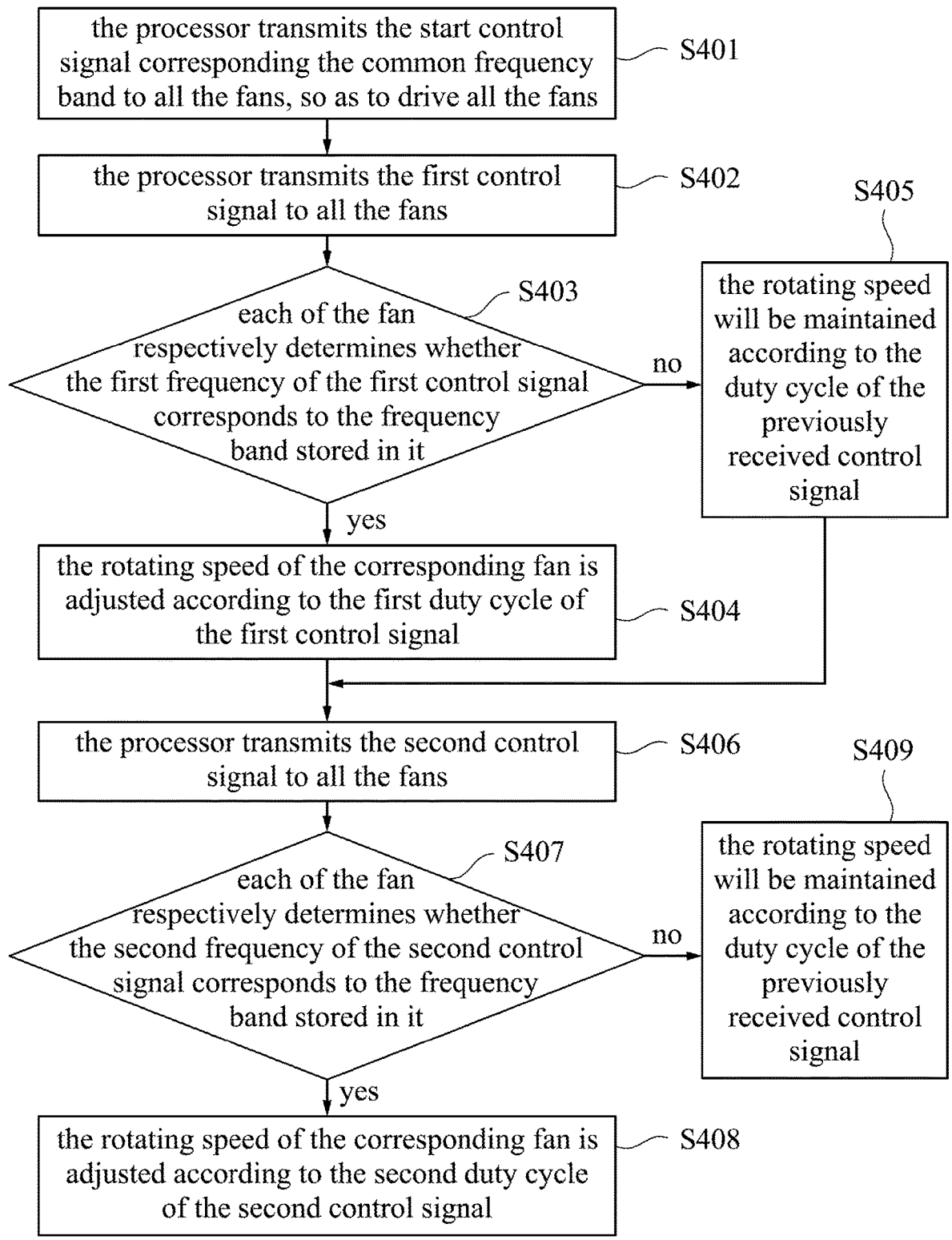
FIG. 4 is a flowchart illustrating a fan driving method method in some embodiments of the present disclosure.
Figure 5A:
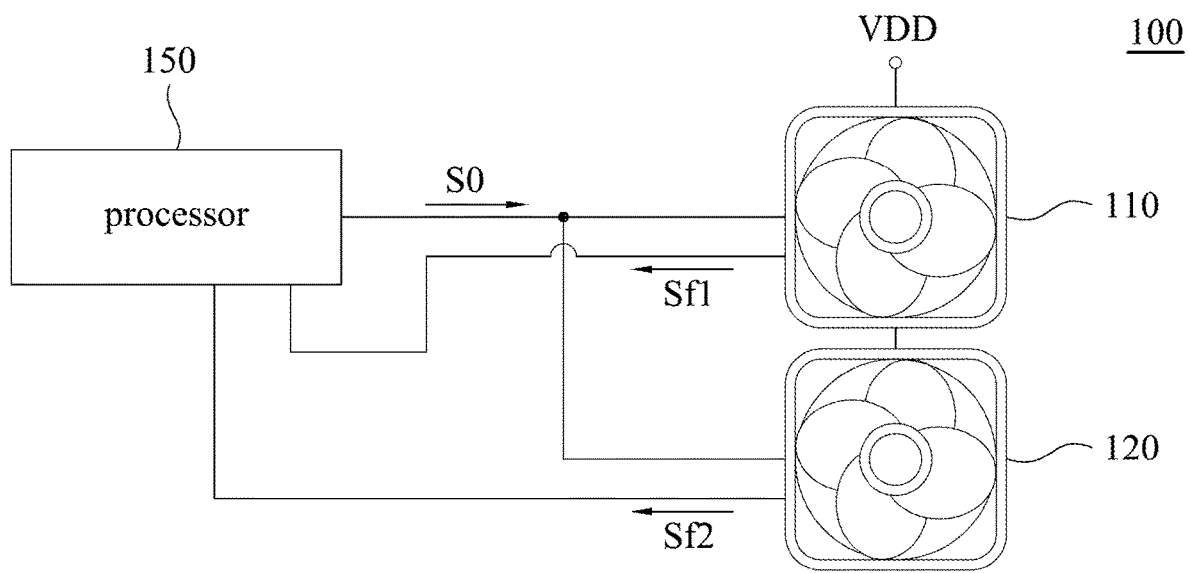
FIGS. 5A-5C are schematic diagrams of operation states of the fan system in some embodiments of the present disclosure.
Figure 5B:
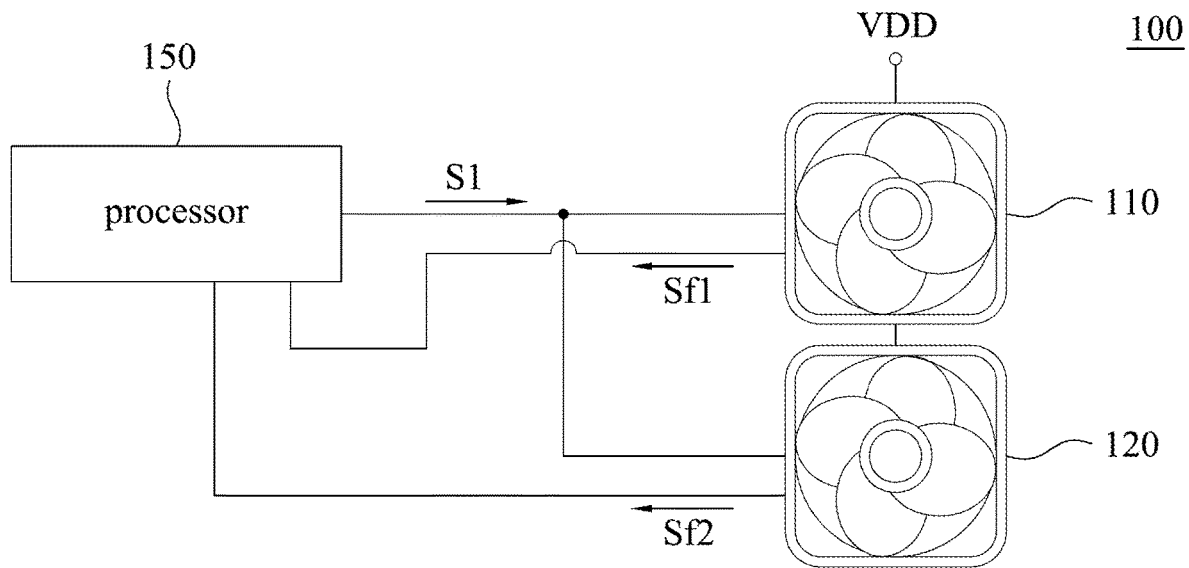
Figure 5C:
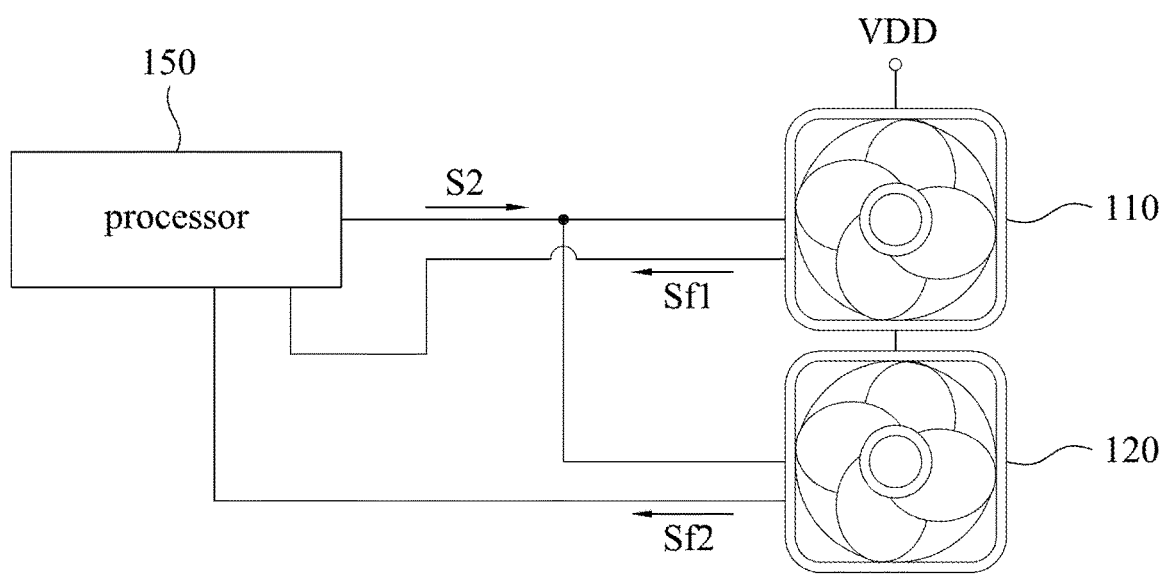

FIG. 4 is a flowchart illustrating a fan driving method method in some embodiments of the present disclosure. FIGS. 5A-5C are schematic diagrams of different operation states of the fan system in some embodiments of the present disclosure. In one embodiment, all of the fans 110, 120 are coupled to the same terminal of the processor 150 to receive the same control signal. The first fan 110 stores the first frequency band and the common frequency band. The second fan 120 stores the second frequency band and the common frequency band. The first frequency band, the second frequency band and the common frequency band are different from each other. In some embodiments, the processor 150 can adjust the output frequency duty and the duty cycle, and the frequency is greater than 20 kHz.

As shown in FIG. 4 and FIG. 5A, in step S401, the processor 150 transmits the start control signal S0 to all the fans 110, 120. The fans 110, 120 further receive power from the power supply VDD. Since the start control frequency of the start control signal S0 corresponds to the common frequency band, fan 110, 120 drives the motor 112/122 to start operation according to the duty cycle of the start control signal S0 and the driving circuit.

As shown in FIG. 5B, in step S402, the processor 150 transmits the first control signal S1 to all the fans 110, 120. In other words, the frequency of the control signal output by the processor 150 will be changed from the start control frequency to the first frequency of the first control signal S1. The duty cycle of the control signal output by the processor 150 is also change into the first duty cycle of the first control signal S1.

In step S403, each of the fan 110/120 respectively determines whether the first frequency of the first control signal S1 corresponds to the frequency band stored in it, so as to determine whether to change the rotating speed. For example, the first fan 110 determines whether the first frequency corresponds to the first frequency band, and the second fan 120 determines whether the first frequency corresponds to the second frequency band.

If the first frequency corresponds to one of the frequency bands, in step S404, the rotating speed of the corresponding fan is adjusted according to the first duty cycle of the first control signal S1. For example, the first frequency corresponds to the first frequency band, then the first fan 110 adjusts the rotating speed according to the first duty cycle.

When the first frequency does not correspond to one of the frequency bands, in step S405, the fans that do not correspond to the first frequency ignore the first control signal S1, and still maintain the rotating speed according to the duty cycle of the previously received control signal (i.e., the start control signal S0). For example, if the first frequency does not correspond to the second frequency band, the second fan 120 still maintains the rotating speed according to the duty cycle of the start control signal S0.

As shown in FIG. 5C, in step S406, the processor 150 transmits the second control signal S2 to all the fans 110, 120. In other words, the frequency of the control signal output by the processor 150 will be changed from the first frequency to the second frequency of the second control signal S2. The duty cycle of the control signal output by the processor 150 is also changed into the second duty cycle of the second control signal S2.

In step S407, each of the fan 110/120 separately determines whether the second frequency of the second control signal S2 corresponds to the frequency band stored in it. For example, the first fan 110 determines whether the second frequency corresponds to the first frequency band, and the second fan 120 determines whether the second frequency corresponds to the second frequency band.

If the second frequency corresponds to one of the frequency bands, in step S408, the rotating speed of the corresponding fan is adjusted according to the second duty cycle of the second control signal S2. For example, the second frequency corresponds to the second frequency band, then the second fan 120 adjusts the rotating speed according to the second duty cycle.

When the second frequency does not correspond to one of the frequency bands, in step S409, the fans that do not correspond to the second frequency ignore the second control signal S2, and still maintains the rotating speed according to the control signal previously received and with the corresponding frequency. For example, if the second frequency S2 does not correspond to the first frequency band, the first fan 110 will maintain the rotating speed according to the first duty cycle.

As shown in FIG. 1, in some embodiments, the processor 150 further stores the first frequency band, the second frequency band, the third frequency band, the fourth frequency band and the common frequency band corresponding to the fans 110-140, and stores the control signal corresponding to different the rotating speed. When the rotating speed needs to be adjusted (e.g., the local temperature in the server needs to be adjusted, or a user control command is received), the processor 150 may check the table stored in it to confirm which the fan needs to be adjusted, and confirm the corresponding the frequency band, and then transmit the control signal with the corresponding frequency.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. A fan driving method, comprising:
transmitting, by a processor, a first control signal to a first fan and a second fan, wherein the first control signal has a first frequency;
determining whether the first frequency is within a first frequency band or a second frequency band, wherein the first frequency band is different from the second frequency band;
when the first frequency is within the first frequency band, adjusting a first rotating speed of the first fan according to the first control signal; and
when the first frequency is within the second frequency band, adjusting a second rotating speed of the second fan according to the first control signal;
wherein the fan driving method further comprises:
determining whether the first frequency is within a common frequency band, wherein the common frequency band is different from the first frequency band and the second frequency band; and
when the first frequency is within the common frequency band, adjusting the first rotating speed of the first fan and the second rotating speed of the second fan according to the first control signal.

2. The fan driving method of claim 1, further comprising:
transmitting, by the processor, a second control signal to the first fan and the second fan, wherein the second control signal has a second frequency;
determining whether the second frequency is within the first frequency band;
when the second frequency is within the first frequency band, adjusting the first rotating speed of the first fan according to the second control signal; and
when the second frequency is not within the first frequency band, maintaining the first rotating speed of the first fan according to the first control signal.

3. The fan driving method of claim 1, further comprising:
detecting, by a first sensor of the first fan, a current rotating speed of the first fan to generate a first fan rotating speed signal; and
transmitting the first fan rotating speed signal to the processor.

4. The fan driving method of claim 1, wherein adjusting the first rotating speed of the first fan according to the first control signal further comprises:
obtaining a first duty cycle of the first control signal; and
driving a first motor of the first fan according to the first duty cycle.

5. A fan system, comprising:
a first fan electrically coupled to a power supply, and driven by a driving power, wherein the first fan stores a first frequency band and a common frequency band;
a second fan electrically coupled to the power supply, and driven by the driving power, wherein the second fan stores a second frequency band and the common frequency band, and the common frequency band is different from the first frequency band and the second frequency band; and
a processor electrically coupled to the first fan and the second fan, and configured to transmit a first control signal to the first fan and the second fan;
wherein the first fan and the second fan are configured to determine whether a first frequency of the first control signal is within the first frequency band;
when the first frequency is within the first frequency band, the first fan adjusts a first rotating speed of the first fan according to the first control signal;
when the first frequency is within the second frequency band, the second fan adjusts a second rotating speed of the second fan according to the first control signal; and
when the first frequency is within the common frequency band, the first fan adjusts the first rotating speed of the first fan according to the first control signal, and the second fan adjusts the second rotating speed of the second fan according to the first control signal.

6. The fan system of claim 5, wherein the first fan determines the first frequency is within the first frequency band, the first fan obtains a first duty cycle of the first control signal to adjusts the first rotating speed of the first fan.

7. The fan system of claim 5, wherein the processor is further configured to transmit a second control signal to the first fan and the second fan when the first fan determines a second frequency of the second control signal is within the first frequency band, the first fan adjusts the first rotating speed of the first fan according to the second control signal; and
when the first fan determines the second frequency of the second control signal is not within the first frequency band, the first fan maintains the first rotating speed of the first fan according to the first control signal.

8. The fan system of claim 5, wherein the first fan and the second fan are electrically coupled to a same terminal to receive the first control signal.

9. The fan system of claim 5, wherein when the first fan operating, the first fan is configured to detect a current rotating speed, and is configured to transmit a first fan rotating speed signal to the processor.

10. The fan system of claim 5, wherein the first fan is further comprises;
a first controller electrically coupled to the processor, and configured to generate a first driving signal according to a first duty cycle of the first control signal;
a first motor electrically coupled to the first controller to drive a first fan blade according to the first driving signal; and
a first sensor electrically coupled to the processor, and configured to detect a rotor position of the first motor or a fan blade position of the first fan blade.

11. A fan driving method, comprising:
transmitting, by a processor, a start control signal to a plurality of fans, wherein the plurality of fans operates according to the start control signal, the start control signal has a start control frequency, the plurality of fans store a plurality of frequency bands, and the frequency bands are different from each other;
transmitting a first control signal to the plurality of fans, wherein the first control signal has a first frequency different from the start control frequency;
when the first frequency is within one of the plurality of frequency bands, adjusting a rotating speed of one of the plurality of fans according to the first control signal; and
maintaining rotating speeds of other of the plurality of fans according to the start control signal.

12. The fan driving method of claim 11, wherein adjusting the rotating speed of the one of the plurality of fans according to the first control signal further comprises:
obtaining a first duty cycle of the first control signal; and
driving a motor of the one of the plurality of fans according to the first duty cycle.

13. The fan driving method of claim 11, further comprising:
detecting, by a plurality of sensors of the plurality of fans, a plurality of current rotating speeds of the plurality of fans to generate a plurality of fan rotating speed signals; and
transmitting the plurality of fan rotating speed signals to the processor.

14. The fan driving method of claim 11, wherein the plurality of fans further store a common frequency band, and the start control signal corresponds to the common frequency band.

* * * * *